United States Patent
Grant et al.

(10) Patent No.: US 9,491,664 B2
(45) Date of Patent: Nov. 8, 2016

(54) BASE STATIONS AND NODES FOR USE IN A MOBILE COMMUNICATIONS NETWORK AND METHODS OF OPERATING THE SAME

(71) Applicant: TELEFONAKTIEBOLAGET L M ERICSSON (PUBL), Stockholm (SE)

(72) Inventors: Stephen Grant, Pleasanton, CA (US); Yi-Pin Eric Wang, Fremont, CA (US); Andreas Höglund, Solna (SE); Edgar Ramos, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/419,142

(22) PCT Filed: Oct. 22, 2012

(86) PCT No.: PCT/SE2012/051129
§ 371 (c)(1),
(2) Date: Feb. 2, 2015

(87) PCT Pub. No.: WO2014/021751
PCT Pub. Date: Feb. 6, 2014

(65) Prior Publication Data
US 2015/0208282 A1    Jul. 23, 2015

Related U.S. Application Data

(60) Provisional application No. 61/679,215, filed on Aug. 3, 2012.

(51) Int. Cl.
*H04W 36/00* (2009.01)
*H04L 1/18* (2006.01)
(Continued)

(52) U.S. Cl.
CPC ........ *H04W 36/0005* (2013.01); *H04L 1/1854* (2013.01); *H04L 1/1864* (2013.01); *H04L 1/1896* (2013.01); *H04W 36/18* (2013.01); *H04L 2001/0092* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 8,169,892 B2 * | 5/2012 | Malkamaki | H04L 1/1838 370/216 |
| 9,143,256 B2 * | 9/2015 | Park | H04J 13/00 |

(Continued)

FOREIGN PATENT DOCUMENTS

| | | |
|---|---|---|
| WO | WO 03/077584 A1 | 9/2003 |
| WO | WO 2004/002008 A1 | 12/2003 |

(Continued)

OTHER PUBLICATIONS

3rd Generation Partnership Project; Technical Specification Group Radio Access Network; UTRAN Overall Description (Release 9). 3GPP TS 25.401 V9.1.0 (Mar. 2010).

(Continued)

*Primary Examiner* — Hong Cho
(74) *Attorney, Agent, or Firm* — Patent Portfolio Builders, PLLC

(57) ABSTRACT

There is provided a method of operating a first base station in a mobile communications network, the network comprising a mobile device, a second base station and a node that controls the first and second base stations, the mobile device having an active connection with the second base station, the mobile device not having an active connection with the first base station, the method comprising receiving a data transmission sent from the mobile device to the second base station; attempting to decode the data transmission; and in the event that the data transmission is successfully decoded, transmitting the decoded data to the node or the second base station. Methods of operating second base stations and nodes that control the operation of the first and second base stations are also provided.

29 Claims, 13 Drawing Sheets

(51) Int. Cl.
*H04W 36/18* (2009.01)
*H04W 84/04* (2009.01)
*H04L 1/00* (2006.01)

(56) References Cited

U.S. PATENT DOCUMENTS

| | | | |
|---|---|---|---|
| 2004/0228315 A1* | 11/2004 | Malkamaki | H04J 3/16 370/342 |
| 2005/0053035 A1* | 3/2005 | Kwak | H04W 72/1268 370/331 |
| 2005/0094600 A1* | 5/2005 | Zhang | H04L 1/1887 370/331 |
| 2007/0010253 A1 | 1/2007 | Gunnarsson et al. | |
| 2010/0062775 A1 | 3/2010 | Hwang | |
| 2010/0304751 A1* | 12/2010 | Ji | H04L 1/02 455/450 |
| 2012/0114050 A1* | 5/2012 | Osterling | H04B 7/024 375/259 |
| 2012/0201202 A1 | 8/2012 | Hong et al. | |

FOREIGN PATENT DOCUMENTS

| WO | WO 2009/072945 A1 | 6/2009 |
|---|---|---|
| WO | 2011043579 | 4/2011 |
| WO | WO 2012/050506 A1 | 4/2012 |
| WO | WO 2013/133746 A2 | 9/2013 |
| WO | WO 2014/021759 A2 | 2/2014 |

OTHER PUBLICATIONS

3rd Generation Partnership Project; Technical Specification Group Radio Access Network; UTRAN Iub/Iur Interface User Plane Protocol for DCH Data Streams (Release 9). 3GPP TS 25.427 V9.0.0 (Dec. 2009).

Sun, et al. Introducing Heterogeneous Networks in HSPA. 2012 IEEE International Conference on, Jun. 10-15, 2012.

Falconetti, et al. Uplink Coordinated Multi-Point Reception in LTE Heterogeneous Networks. Wireless Communication Systems (ISWCS), 2011 8th International Symposium on, val., No., pp. 764,768, Nov. 6-9, 2011.

Falconetti, et al. Distributed Uplink Macro Diversity for Cooperating Base Stations. Communications Workshops, 2009. ICC Workshops 2009. IEEE International Conference on, val., No., pp. 1,5, Jun. 14-18, 2009.

Hu, et al. Mobile Association in a Heterogeneous Network. Communications (ICC), 2010 IEEE International Conference on, vol., No., pp. 1,6, May 23-27, 2010.

Grant, et al. Uplink CaMP for HSPA. Vehicular Technology Conference (VTC Spring), 2011 IEEE 73rd, val., No., pp. 1,5, May 15-18, 2011.

* cited by examiner

BASE STATIONS AND NODES FOR USE IN A MOBILE COMMUNICATIONS NETWORK AND METHODS OF OPERATING THE SAME

This application claims the benefit of US Provisional Application No. 61/679,215, filed Aug. 3, 2012, the disclosure of which is fully incorporated herein by reference.

TECHNICAL FIELD

The invention relates to a mobile communications network, and in particular relates to an improved way of managing the operation of mobile communication devices in an imbalanced region of a heterogeneous network, particularly for devices operating in the CELL_FACH state (or similar states in other types of mobile communication networks).

BACKGROUND

Heterogeneous networks are an efficient network deployment solution for satisfying the ever-increasing demand of mobile broadband services. In a heterogeneous network, a low- or lower-power node (LPN), for example a picocell, microcell or femtocell base station (NodeB), is placed in a traffic hot spot within the coverage area of a high- or higher-power node, for example a macrocell base station, to better serve nearby mobile devices. Deploying a low power node in a traffic hot spot may significantly reduce the load in the macro or other higher-power cell covering the area.

The traffic uptake of an LPN however may be somewhat limited. This is due to the transmit power difference between a macro base station (BS) and an LPN, e.g. 40W vs. 5W. This is illustrated in FIG. 1. In FIG. 1, the network 2 is shown as comprising a low power node 4 (e.g. picocell or microcell base station) placed within the coverage area of a macrocell base station 6. Each of the LPN 4 and macrocell base station 6 are connected to a radio network controller (RNC) 8 (typically via an Iub interface in UMTS), which in turn connects to a core network 10. As downlink signal strength or quality is used as a basis for triggering a hand over between base stations, the border 12 of the LPN cell is determined by the downlink (DL) signal strength or quality as measured by a mobile communications device 12 (also known as a user equipment—UE). In high speed packet access (HSPA) networks, the quality of the common pilot channel (CPICH) is measured. The border 12 occurs at the point where the downlink signal strength or quality from the LPN 4 is the same as the downlink signal strength or quality from the macrocell base station 6. As the LPN 4 has a much lower transmit power level compared to the macrocell base station 6, the cell border 12 is much closer to the LPN 4 than the macrocell base station 6. However from the uplink (UL) perspective, the base station transmit power difference is irrelevant and the UE 14 would be best served by the base station to which it has the lowest path loss.

Thus, for the UL, the cell border should be somewhere near the equal-distance point between the two base stations 4, 6 since at the equal-distance points the path loss from the UE 14 to both base stations 4, 6 is approximately equal.

The region 16 between the UL 'border' and DL border 12 is often referred to as the imbalanced region 16. In the imbalanced region, the UL from the UE 14 would generally be better served by the low-power node 4 (as it is closer to the UE 14 than the macrocell base station 6), but the DL would be better served by the macrocell base station 6. However, as cell selection is determined on the basis of the DL signal quality, a UE 14 in the imbalanced region 16 will generally be served by the macrocell base station 6, meaning that the UE 14 cannot take advantage of the better UL to the LPN 4.

One option for mitigating the imbalance is to extend the range of the LPN 4 by introducing an offset in the process of cell selection/reselection such that a UE 14 in a portion of the imbalance region 16 is served by the LPN 4 rather than the macrocell base station 6. This is referred to as 'range extension'. For example, in a UMTS 3G network, a cell individual offset (CIO) can be used to adjust the cell border for UEs that are in the CELL_DCH state. CIO may be signalled in-band to a UE and thus can be specified for each UE. A UE uses the CIO to bias its mobility measurements (i.e. measurements of the DL signals from the LPN 4 and/or macrocell base station 6). For example, a UE 14 can make use of a weaker cell (i.e. LPN 4 when the UE 14 is in the imbalanced region 16) by applying a large CIO to the measured DL signal quality from the LPN 4. The signal quality can be either the common pilot channel (CPICH) RSCP (received code power) or CPICH $E_c/N_o$ (energy per chip over noise power spectral density ratio).

Cell selection during the UMTS CELL_FACH state (i.e. the UE has no assigned dedicated radio resource) may be based on CPICH RSCP or CPICH Ec/No measurements, and parameters labelled QOffset1sn (for CPICH RSCP measurements) and QOffset2sn (for CPICH $E_c/N_o$ measurements) can be used to bias cell selection. There are other cell selection priority parameters that may be used to give a carrier or cell a higher absolute cell selection priority. Each cell broadcasts the QOffset1sn and QOffset2sn values for use by all UEs 14 in all its neighbouring cells, and the values of QOffset1sn and QOffset2sn are coordinated among cells that share the same cell border in order for the cell border to be consistent regardless of the cell in which a UE 14 is located.

FIG. 2 illustrates an example of cell range extension (CRE) in the network of FIG. 1. The DL border 12 corresponds to the conventional situation where no offset is applied to the signal quality measurements. However, if for the cell managed by the LPN 4 an offset is specified, the cell border 12 between the LPN 4 and macrocell base station 6 for UEs being served by the LPN 4 will be moved further from the LPN 4 (indicated by cell border 18).

Thus, moving the cell border 12 to increase the traffic uptake of a low-power node 4 is an attractive enhancement for heterogeneous network deployments. It is beneficial from an UL perspective since the UE 14 will be served by the base station to which the path loss is lower (i.e. the LPN 4 in FIGS. 1 and 2). However, care must be taken not to extend the range too far. Excessive range expansion leads to degradation in the DL performance for a UE 14 served by a low-power node 4 since the received DL power from the serving low-power node 4 in the imbalanced region 16 is weaker than that from the non-serving macrocell base station 6. In addition to the desired signal being weaker, the interference from the macrocell DL is also stronger. Poor DL performance may also impact UL performance since the UL data channel (for example, enhanced-dedicated channel—E-DCH) requires reliable DL signalling (e.g. enhanced-absolute grant channel—E-AGCH, enhanced-relative grant channel—E-RGCH and enhanced-DCH hybrid ARQ indicator channel—E-HICH). Poor DL performance may also cause handoff problems when the signalling radio bearer (SRB) is carried by the downlink shared channel (HS-DSCH).

To avoid such asymmetric behaviour, some form of UL/DL separation is desirable. Inherently in an HSPA system, this occurs to a certain degree by virtue of uplink soft handover (SHO) that may be configured when the UE is in CELL_DCH state. In uplink soft handover, a UE 14 can be connected to two or more cells, and each cell receives the UL transmissions from the UE 14 and passes them to the RNC 8 which selects the signal with the highest quality. A form of soft handover may be employed to leverage the SHO feature to an even greater degree. With this form of soft handover, a UE 14 in the imbalanced region 16 continues to be served by the macrocell base station 6. However, in the uplink the UE establishes a connection to both the macrocell base station 6 and LPN 4. This is illustrated in FIG. 1, in which the UL connection from the UE 14 in the imbalanced region 16 to the serving macrocell base station 6 is shown by arrow 20 and the UL connection to the LPN 4 is shown by dashed line 22. In the SHO region the path loss to the LPN 4 is lower than to the macrocell base station 6, hence the power control loop is effectively "steered" by the LPN 4. In this way, a partial UL/DL separation is achieved in that the uplink transmissions are most often decoded correctly at the LPN 4 (due to the lower path loss) while the downlink transmissions still occur from the macrocell base station 6 (which has the highest received quality at the UE 14).

FIG. 3 illustrates an exemplary configuration for soft handover involving a macrocell base station 6 and a LPN 4 (e.g. a picocell base station 4) for a UE 14 operating in the CELL_DCH state (i.e. a dedicated physical channel is allocated to the UE 14 in the UL and DL). The existing mechanisms for the interaction of hybrid automatic repeat request (HARQ) on the physical layer and automatic repeat request (ARQ) on the radio link control (RLC) layer during soft handover will be discussed below. For a UE 14 in the CELL_DCH state a number of downlink control channels are configured between each NodeB 4, 6 and the UE 14, the most relevant one being the Enhanced-Hybrid ARQ Indicator Channel (E-HICH). This control channel carries the acknowledgement/non-acknowledgement (ACK/NACK) in response to successful/failed decoding of the uplink data transmissions from the UE 14 on the enhanced dedicated physical data channel (E-DPDCH). In soft handover, if the UE 14 receives an ACK on either or both of the E-HICH channels from the macrocell base station 6 or LPN 4, the UE 14 sends new data in the UL. If the UE 14 receives a NACK on both E-HICH channels, the UE 14 retransmits the relevant previously-transmitted data. Effectively, a logical OR operation is applied to the ACK/NACK messages received on the two E-HICH channels.

In more detail, the UE 14 generates MAC-i/is protocol data units (PDUs) and transmits them over the physical (PHY) layer where they are received by each NodeB 4, 6, as shown in FIG. 4. As described above, Hybrid ARQ (HARQ) operates separately within the media access control (MAC) layer in each NodeB 4, 6. Once successful decoding occurs at a particular NodeB 4, 6, the MAC-i/is PDUs are forwarded from the NodeB to the RNC over the Iub interface. In the RNC 8, the MAC-is PDUs are then further processed for delivery to higher layers. The relevant higher layer for discussion here is the radio link control (RLC) protocol which supports, among other things, selective repeat ARQ and encryption of user-plane data.

The E-DCH Frame Protocol (FP) handles the transmission of the MAC-i/is PDUs over the Iub interface. FIG. 5 shows where in the protocol stack the FP exists both on the NodeB 4, 6 and RNC 8 sides. It sits above the transport network layer (TNL) that actually carries the FP data over the Iub interface.

FIG. 6 shows the structure of the E-DCH UL Data Frame for carrying the MAC-i/is PDUs over the Iub interface between the NodeB 4, 6 and RNC 8. The E-DCH UL Data Frame is transmitted over the Iub interface under two conditions: (1) a codeword is successfully decoded at the NodeB 4, 6, or (2) a HARQ failure is declared which occurs if the number of HARQ transmissions exceeds a maximum value. In the former case, the E-DCH data frame shown in FIG. 6 contains a payload 20 of a certain number of MAC-is PDUs. In the latter case, the E-DCH Data Frame carries no payload. In both cases the number of HARQ retransmissions ("N of HARQ Retransm" field 22) is indicated either upon successful decoding or upon declaration of a HARQ failure.

In the above form of SHO, if both the macrocell base station 6 and LPN 4 declare a HARQ failure, then an RLC retransmission is requested by the RNC 8, thus activating the selective repeat ARQ mechanism of the RLC protocol. In this case an RLC NACK message is generated and sent to the UE 14 through higher layer radio resource control (RRC) signalling. The higher layer signalling is carried by the same physical channel that carries downlink user data, namely the high-speed downlink shared channel (HS-DSCH) which is transmitted by the serving cell 6. When the RRC RLC NACK is received and decoded by the UE 14, the UE 14 retransmits the frame for which HARQ failure occurred previously. In this way, the RLC layer is able to recover for any failures made at the MAC layer.

As mentioned above, one problem with cell range expansion, especially if taken too far, is that it may result in a degraded downlink for a UE 14 even if the uplink is improved. This asymmetric behaviour is undesirable.

A shortcoming of the above soft handover approach is that it is available only for UEs in CELL_DCH connection state. For UEs 14 operating in the CELL_FACH state (i.e. in which there is no dedicated physical channel allocated to the UE 14), the current standard does not support soft handover in order to maintain the simplicity and reduced overhead of this connection state. Without CRE, a UE 14 in the imbalanced region 16 in CELL_FACH state always connects to the macrocell base station 6, thereby compromising the quality of the uplink. Consideration of the CELL_FACH state is important since this state is primarily useful for short data transmissions which commonly occur with smart phone traffic. It has been found that this type of traffic is already predominant in networks, and is expected to grow further.

Therefore, there is a need for an improved way of managing the operation of mobile communication devices in an imbalanced region of a heterogeneous network, for example by enabling separation between the uplink and downlink transmissions, particularly for devices operating in the CELL_FACH state (or similar states in other types of mobile communication networks).

SUMMARY

According to a first aspect, there is provided a method of operating a first base station in a mobile communications network, the network comprising a mobile device, a second base station and a node that controls the first and second base stations, the mobile device having an active connection with the second base station, the mobile device not having an active connection with the first base station, the method comprising receiving a data transmission sent from the mobile device to the second base station; attempting to decode the data transmission; and in the event that the data transmission is successfully decoded, transmitting the decoded data to the node or the second base station.

The decoded data preferably comprises packets of data.

In some implementations, the step of transmitting comprises transmitting the decoded data to the node. In some implementations, the decoded data comprises I-Q samples of the received data transmission and the step of transmitting comprises transmitting the I-Q samples to the second base station.

In some implementations, in the event that the data transmission is successfully decoded, the step of transmitting comprises transmitting the decoded data to the node, and the method further comprises the step of transmitting a signal to the node indicating a decoding failure in the event that the data transmission is not successfully decoded. The signal indicating a decoding failure can comprise a HARQ failure signal.

In some implementations, the step of transmitting comprises transmitting the decoded data to the node in the event that the data transmission is successfully decoded, and the method further comprises the step of transmitting a signal to the second base station indicating the success or failure of the attempt to decode the data transmission. The signal indicating the success or failure of the attempt to decode the data transmission can comprise an ACK/NACK signal.

In these implementations, the method can further comprise the step of transmitting a signal to the node indicating a decoding failure in the event that a data transmission is not successfully decoded after a predetermined number of retransmissions of the data transmission by the mobile device.

In some implementations, the method further comprises the steps of receiving an indication of a scrambling code and/or an identifier used by the mobile device in transmitting data; and receiving information on the timing of data transmissions by the mobile device; wherein the steps of receiving a data transmission and attempting to decode the data transmission comprises using the received indication of the scrambling code and/or the identifier and the information on the timing of data transmission by the mobile device.

According to a second aspect, there is provided a computer program product, comprising computer readable code embodied therein, the computer readable code being configured such that, on execution by a suitable processor or computer, the processor or computer is configured to perform the method of operating a first base station as described above.

According to a third aspect, there is provided a first base station for use in a mobile communications network, the network comprising a mobile device, a second base station and a node that controls the first and second base stations, the mobile device having an active connection with the second base station, the mobile device not having an active connection with the first base station, the first base station comprising a transceiver module configured to receive a data transmission sent from the mobile device to the second base station; and a processing module configured to attempt to decode the data transmission and to cause decoded data to be transmitted to the node or the second base station in the event that the data transmission is successfully decoded.

Various embodiments of the first base station are also provided that have a processing module and/or transceiver module configured to perform the steps contained in the above-defined methods.

According to a fourth aspect, there is provided a method of operating a second base station in a mobile communication network, the network comprising a mobile device, a first base station and a node that controls the first and second base stations, the mobile device having an active connection with the second base station, the mobile device not having an active connection with the first base station, the method comprising receiving a data transmission from the mobile device; attempting to decode the data transmission; and regardless of whether the data transmission is successfully decoded, transmitting a signal to the mobile device indicating that the data transmission has been successfully decoded.

The signal can be an ACK signal.

In some implementations, the method further comprises the step of transmitting decoded data to the node in the event that the data transmission is successfully decoded.

In some implementations, the method further comprises receiving a higher layer signal indicating the successful or unsuccessful decoding of the data transmission from the node; and transmitting the higher layer signal indicating the successful or unsuccessful decoding of the data transmission to the mobile device. The higher layer signal can be a radio link control, RLC, ACK/NACK signal.

According to fifth aspect, there is provided a computer program product, comprising computer readable code embodied therein, the computer readable code being configured such that, on execution by a suitable processor or computer, the processor or computer is configured to perform the method of operating a second base station as described above.

According to a sixth aspect, there is provided a second base station for use in a mobile communication network, the network comprising a mobile device, a first base station and a node that controls the first and second base stations, the mobile device having an active connection with the second base station, the mobile device not having an active connection with the first base station, the second base station comprising a transceiver module configured to receive a data transmission from the mobile device; and a processing module configured to attempt to decode the data transmission and to transmit a signal to the mobile device indicating that the data transmission has been successfully decoded, regardless of whether the data transmission is successfully decoded.

Various embodiments of the second base station are also provided that have a processing module and/or transceiver module configured to perform the steps contained in the above-defined methods.

According to a seventh aspect, there is provided a method of operating a second base station in a mobile communication network, the network comprising a mobile device, a first base station and a node that controls the first and second base stations, the mobile device having an active connection with the second base station, the mobile device not having an active connection with the first base station, the method comprising receiving a data transmission from the mobile device; attempting to decode the data transmission; receiving an indication from the first base station regarding the data transmission; and sending a signal to the mobile device indicating whether the data transmission has been successfully decoded based on the attempt to decode the data transmission and the received indication.

In some implementations, the indication received from the first base station is a signal indicating whether the first base station has decoded the data transmission from the mobile device. The signal indicating whether the first base station has decoded the data transmission can comprise an ACK or NACK signal.

In alternative implementations, the signal indicating whether the first base station has decoded the data transmission comprises decoded data following successful decoding of the data transmission by the first base station.

In these implementations, the method can further comprise the step of transmitting the decoded data received from the first base station to the node if the second base station does not otherwise successfully decode the data transmission.

In some implementations, the method further comprises the step of transmitting decoded data to the node in the event that the data transmission is successfully decoded by the second base station.

The step of sending a signal to the mobile device can comprise sending a signal indicating that the data transmission has been successfully decoded in the event that either or both of (i) the second base station successfully decodes the data transmission, and (ii) the indication received from the first base station indicates that the first base station has successfully decoded the data transmission.

In some implementations, the step of sending a signal to the mobile device comprises sending a signal indicating that the data transmission has not been successfully decoded in the event that (i) the second base station does not successfully decode the data transmission, and (ii) the indication received from the first base station indicates that the first base station has not successfully decoded the data transmission.

In alternative implementations, the indication received from the first base station regarding the data transmission comprises I-Q samples of the data transmission received at the first base station, and wherein the step of attempting to decode the data transmission includes using the received I-Q samples to decode the data transmission.

In these implementations, the step of sending a signal to the mobile device can comprise sending a signal indicating that the data transmission has been successfully decoded in the event that the second base station successfully decodes the data transmission using the received I-Q samples.

In these implementations, the step of sending a signal to the mobile device can comprise sending a signal indicating that the data transmission has not been successfully decoded in the event that the second base station does not successfully decode the data transmission using the received I-Q samples.

In some cases, the method can further comprise the step of transmitting a signal to the node indicating a decoding failure in the event that the data transmission is not successfully decoded after a predetermined number of retransmissions of the data transmission by the mobile device.

In some implementations, the method further comprises receiving a higher layer signal indicating the successful or unsuccessful decoding of the data transmission from the node; and transmitting the higher layer signal indicating the successful or unsuccessful decoding of the data transmission to the mobile device.

According to an eighth aspect, there is provided a computer program product, comprising computer readable code embodied therein, the computer readable code being configured such that, on execution by a suitable processor or computer, the processor or computer is configured to perform any of the methods of operating a second base station described above.

According to a ninth aspect, there is provided a second base station for use in a mobile communication network, the network comprising a mobile device, a first base station and a node that controls the first and second base stations, the mobile device having an active connection with the second base station, the mobile device not having an active connection with the first base station, the second base station comprising a transceiver module configured to receive a data transmission from the mobile device and an indication from the first base station regarding the data transmission; and a processing module configured to attempt to decode the data transmission and to cause a signal to be sent to the mobile device indicating whether the data transmission has been successfully decoded based on the attempt to decode the data transmission and the received indication.

Various embodiments of the second base station are also provided that have a processing module and/or transceiver module configured to perform the steps contained in the above-defined methods.

According to a tenth aspect, there is provided a method of operating a node in a mobile communication network, the network comprising a mobile device, a first base station and a second base station, the mobile device having an active connection with the second base station, the mobile device not having an active connection with the first base station, the method comprising following the transmission of data from the mobile device to the second base station, receiving an indication regarding the decoding of the data from at least the first base station; and based on the received indication, sending a signal to the mobile device via the second base station indicating whether the data has been successfully decoded.

The indication received from the first base station can comprise the decoded data in the event that the first base station successfully decodes the data transmission.

The indication received from the first base station can comprise a signal indicating that decoding of the data transmission has been unsuccessful at the first base station in the event that the first base station is unsuccessful in decoding the data transmission.

Alternatively, the indication received from the first base station can comprise a signal indicating that decoding of the data transmission has been unsuccessful at the first base station in the event that the first base station is unsuccessful in decoding the data transmission following a predetermined number of retransmissions of the data transmission by the mobile device.

In some implementations, the method comprises receiving a respective indication regarding the decoding of the data from the first base station and the second base station.

The indication received from the second base station can comprise the decoded data.

In some implementations, the indication received from the second base station can comprise a signal indicating that decoding of the data transmission has been unsuccessful.

In some implementations, the indication received from the second base station comprises a signal indicating that decoding of the data transmission has been unsuccessful at the second base station in the event that the second base station is unsuccessful in decoding the data transmission following a predetermined number of retransmissions of the data transmission by the mobile device.

In some implementations, the step of sending a signal to the mobile device comprises sending a radio link control, RLC, ACK or NACK signal to the mobile device based on the received indication.

According to an eleventh aspect, there is provided a computer program product, comprising computer readable code embodied therein, the computer readable code being configured such that, on execution by a suitable processor or computer, the processor or computer is configured to perform any of the methods of operating a node described above.

According to a twelfth aspect, there is provided a node for use in a mobile communication network, the network comprising a mobile device, a first base station and a second base station, the mobile device having an active connection with the second base station, the mobile device not having an active connection with the first base station, the node comprising a processing module configured to receive an indication regarding the decoding of the data from at least the first base station following the transmission of data from the mobile device to the second base station, and to cause a signal to be sent to the mobile device via the second base station indicating whether the data has been successfully decoded based on the received indication.

Various embodiments of the node are also provided that have a processing module and/or transceiver module configured to perform the steps contained in the above-defined methods.

According to a thirteenth aspect, there is provided a method of operating a mobile communication network, the network comprising a mobile device, a first base station and a second base station, the mobile device having an active connection with the second base station, the mobile device not having an active connection with the first base station, the method comprising the mobile device transmitting data to the second base station; receiving the transmitted data at the first and second base stations; attempting to decode the transmitted data at each of the first and second base stations; in the event that one or both of the first and second base stations successfully decode the transmitted data transmitting the decoded data from the one or both of the first and second base stations that successfully decoded the data to the node; and sending a signal to the mobile device from the node via the second base station indicating the successful decoding of the transmitted data; and in the event that neither of the first and second base stations successfully decode the transmitted data, sending a signal to the mobile device from the second base station indicating the unsuccessful decoding of the transmitted data.

According to a fourteenth aspect, there is provided a mobile communication network comprising a first base station as described above, at least one second base station as described above and a node as described above configured to control the first and second base stations.

BRIEF DESCRIPTION OF THE DRAWINGS

Embodiments of the invention will now be described, by way of example only, with reference to the following drawings, in which.

DETAILED DESCRIPTION

Briefly, the methods described herein enable a form of uplink soft handover for a mobile device 14 that is in the CELL_FACH connection state in an HSPA heterogeneous network. Although embodiments described below refer to a UMTS/HSPA mobile communications network, it will be appreciated that the teachings of this application are applicable to other types of network in which nodes of differing transmit power can be deployed.

In addition, although the specific embodiments described below refer to a picocell base station (or low-power node/base station, LPN) within the coverage area of a macrocell base station (or higher-power node/base station), it will be appreciated that the teachings of this application are applicable to any type of heterogeneous deployment of nodes (e.g. a picocell base station within the coverage area of a microcell base station, a microcell base station within the coverage area of a macrocell base station, or a femtocell base station within the coverage area of any of a picocell, microcell or macrocell base station).

Figure 7:
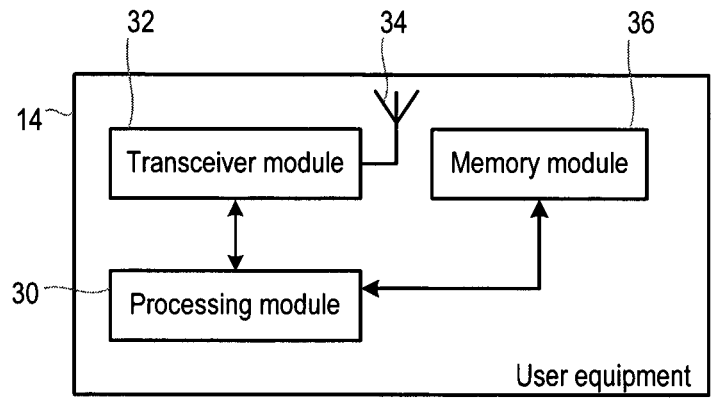
FIG. 7 is a block diagram of a user equipment.

FIG. 7 shows a UE 14 that can be used in one or more of the embodiments described below. The UE 14 comprises a processing module 30 that controls the operation of the UE 14. The processing module 30 is connected to a receiver or transceiver module 32 with associated antenna(s) 34 which are used to receive signals from a base station 4, 6 in the network 2. The user equipment 14 also comprises a memory module 36 that is connected to the processing module 30 and that stores information and data required for the operation of the UE 14, including data received from the network 2 and data to be transmitted over the network 2.

Figure 8:
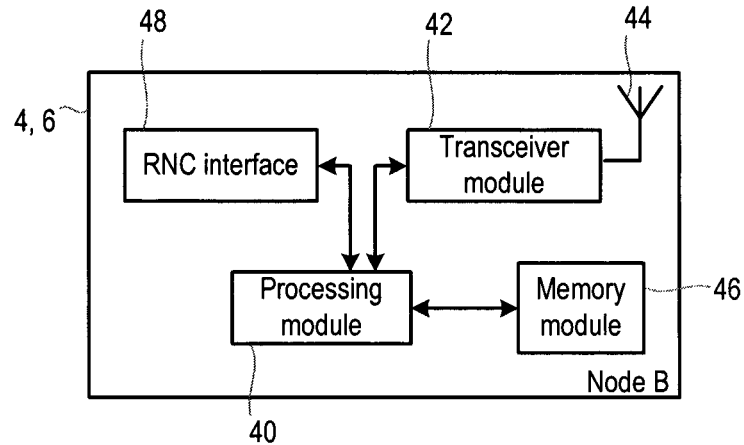
FIG. 8 is a block diagram of a base station.

FIG. 8 shows a base station 4, 6 (called a Node B in UMTS) that can be used in one or more of the embodiments described below. Although in practice the picocell base station 4 will not be identical in size and structure to the macrocell base station 6, for the purposes of this description, the base stations 4, 6 are considered to comprise the same components. Thus, the base station 4, 6 comprises a processing module 40 that controls the operation of the base station 4, 6. The processing module 40 is connected to a transceiver module 42 with associated antenna(s) 44 which are used to transmit signals to, and receive signals from, user equipments 14 in the network 2. The base station 4, 6 also comprises a memory module 46 that is connected to the processing module 40 and that stores information and data required for the operation of the base station 4, 6. The base station 4, 6 also includes components and/or circuitry 48 for allowing the base station 4, 6 to exchange information with the RNC 8 (which is typically via the Iub interface).

Figure 9:
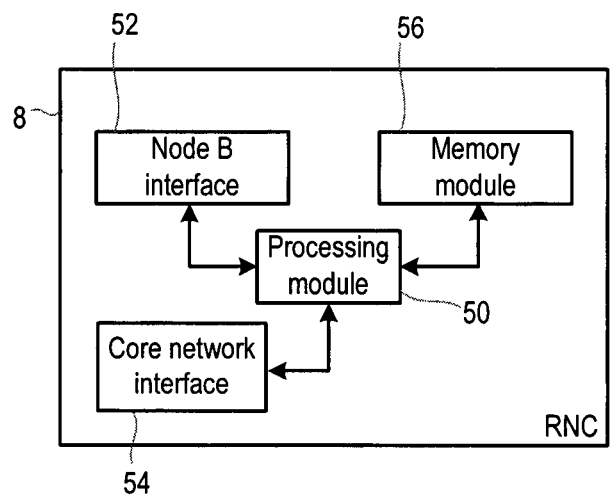
FIG. 9 is a block diagram of a radio network controller.

FIG. 9 shows a radio network controller (RNC) 8 that can be used in one or more of the embodiments described below. The RNC 8 comprises a processing module 50 that controls the operation of the RNC 8. The processing module 50 is connected to components and/or circuitry 52 for allowing the RNC 8 to exchange information with the base stations 4, 6 with which it is associated (which is typically via the Iub interface), and components or circuitry 54 for allowing the RNC 8 to exchange information with the core network 10 (which is typically via the Iu-CS and/or Iu-PS interface). The RNC 8 also comprises a memory module 56 that is connected to the processing module 50 and that stores information and data required for the operation of the RNC 8.

Figure 3:
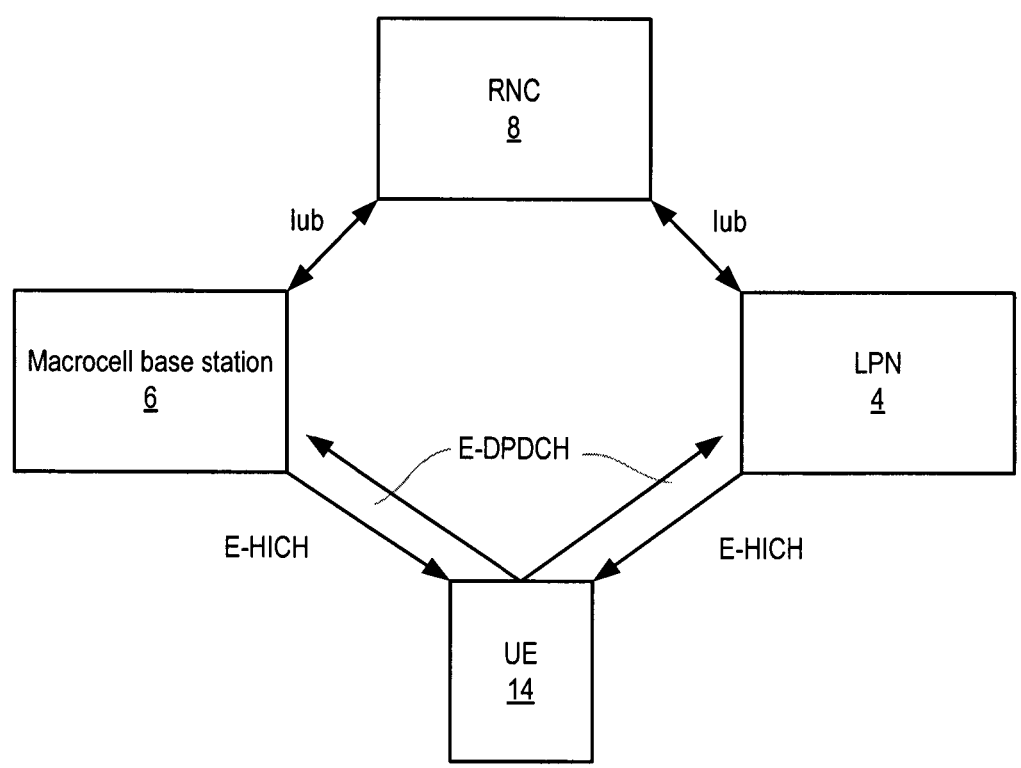
FIG. 3 is a block diagram illustrating connections in an HSPA network when soft handover is being used.
Figure 4:
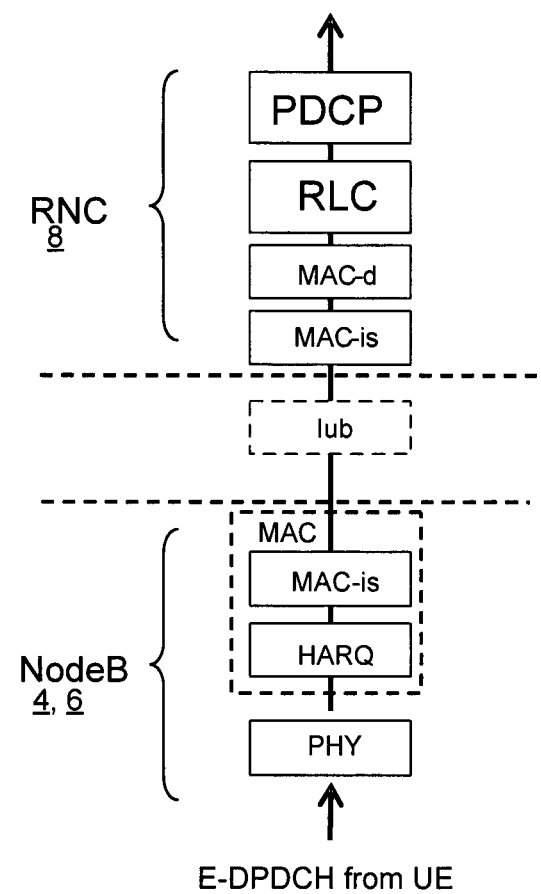
FIG. 4 is a diagram illustrating the protocols involved in uplink data transmission in an HSPA network.
Figure 5:
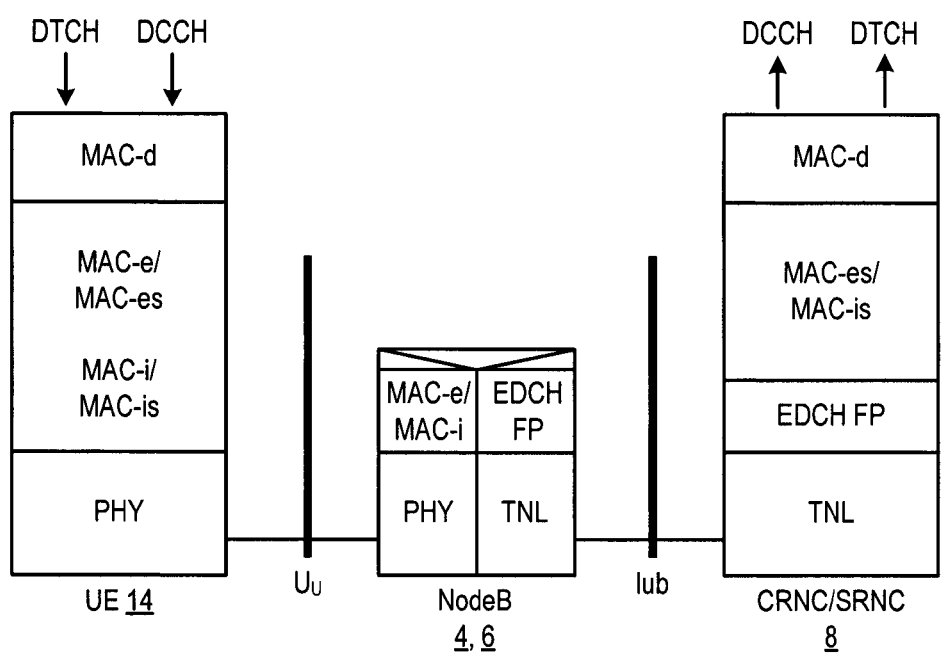
FIG. 5 is a diagram showing the protocol stacks in the nodes of an HSPA network.

It will be appreciated that, for simplicity, only components of the UE 14, Node B 4, 6 and RNC 8 required to illustrate the methods described below are shown in FIGS. 3, 4 and 5.

In the embodiments below, a low-power base station, for example picocell base station 4, is configured to 'eavesdrop' on the data transmission (e.g. E-DCH transmission) of a mobile device 14 that is being served by a higher-power base station, for example macrocell base station 6. If the mobile device 14 is in an imbalanced region 16 between the low-power base station 4 and higher power base station 6, the low-power base station 4, which does not have active data or control channel connections with the mobile device 14, will receive the data transmission (via antenna 44 and transceiver module 42) that is sent by the mobile device 14 to the higher-power base station 6 in a data uplink channel (for example E-DPDCH). In addition to the higher-power base station 6 attempting to decode the received signals (for example using its processing module 40), the low-power base station 4 will process the received data transmission (for example using its respective processing module 40) and attempt to decode the received signals. If the low-power base station 4 decodes the received signals (for example if the low-power base station 4 extracts the data packets (MAC-i/is packet data units (PDUs)) from the received signals), the low power base station 4 transmits the decoded data to the network node 8 associated with the low power base station 4, for example through the radio network controller, RNC, interface 48 to RNC 8. The use of the low power base station 4 in this way allows the service provided in the uplink from the mobile device 14 to be improved.

However, as the low power base station 4 does not have an active data or control channel connection with the mobile device 14, provision needs to be made for the signalling relating to the successful or unsuccessful decoding of the transmitted data (e.g. automatic repeat request (ARQ) and/or hybrid ARQ (HARQ) signalling) to be managed so that retransmission of data by the mobile device 14 can be requested where necessary.

In a first specific embodiment described below with reference to FIGS. 10 and 11, the physical layer hybrid-ARQ (HARQ) procedure that is operating in relation to the decoding of the data transmission in the higher-power base station 6 is disabled to prevent this procedure from initiating the retransmission of data by the mobile device 14 when the higher-power base station 6 is unable to decode the data transmission. In this embodiment, decoding errors (e.g. the inability to successfully decode the data) at the low power base station 4 are handled through the automatic repeat request (ARQ) mechanism operating in the radio link control (RLC) layer in the network node 8. In preferred implementations, the HARQ procedure in the higher-power base station 6 is effectively disabled by the higher-power base station 6 always transmitting positive acknowledgement ('ACK') messages to the mobile device 14 using a downlink control channel (e.g. E-HICH), which is already established between the higher-power base station 6 and the mobile device 14. The RLC acknowledgement/non-acknowledgement (ACK/NACK) messages relating to the success or failure of the decoding of the data transmission by the low-power base station 4 and higher-power base station 6 are sent to the mobile device 14 by higher layer signalling from the network node 8 (which is sent via the higher-power base station 6).

In a second specific embodiment described below with reference to FIGS. 12 and 13, a HARQ ACK/NACK from the low power base station 4 is communicated to the higher-power base station 6 over a (preferably) low latency backhaul connection. This ACK/NACK is combined with the HARQ ACK/NACK generated in the higher power base station for that data transmission, and the result of the combination used to determine the ACK or NACK message to be transmitted to the mobile device 14 over the downlink control channel (e.g. E-HICH), which is already established between the higher power base station 6 and the mobile device 14.

With the methods described herein, a mobile device 14 located in an imbalanced region 16 between low- and higher-power base stations 4, 6 may enjoy the benefits of a better uplink channel to the low-power base station 4 rather than to the higher-power base station 6, while still being physically connected to the higher power base station 6 in the downlink. In this way, the desirable goal of achieving uplink/downlink separation is achieved.

Figure 1:
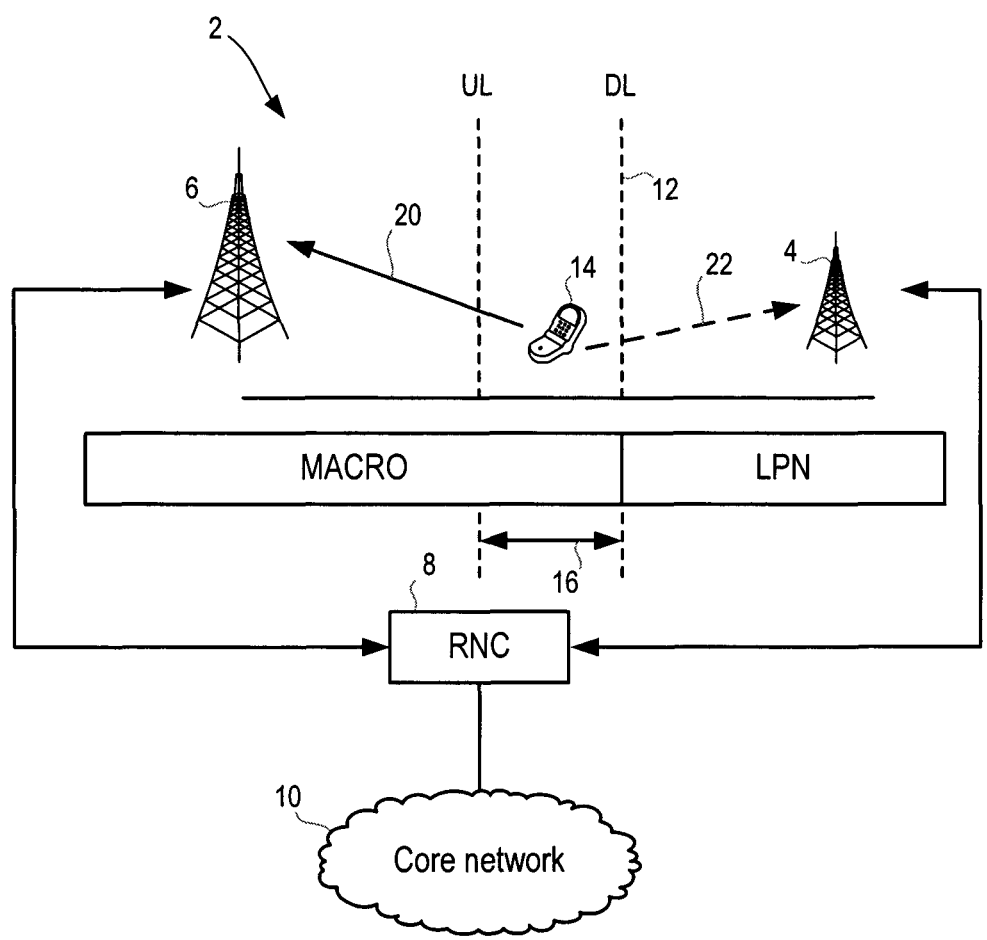
FIG. 1 is an illustration of a network.
Figure 2:
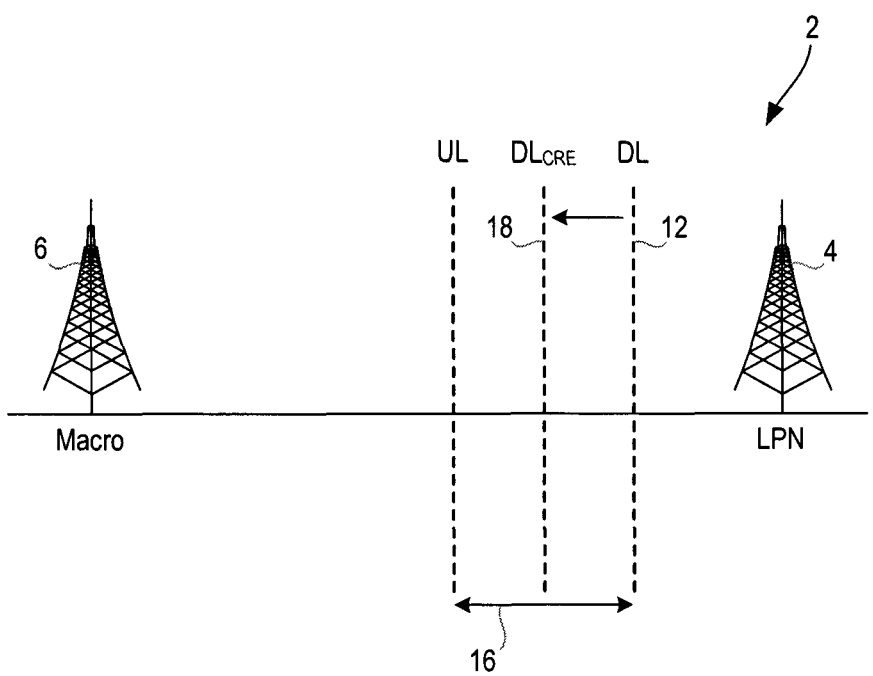
FIG. 2 illustrates the movement of a cell border using an offset value.
Figure 10:
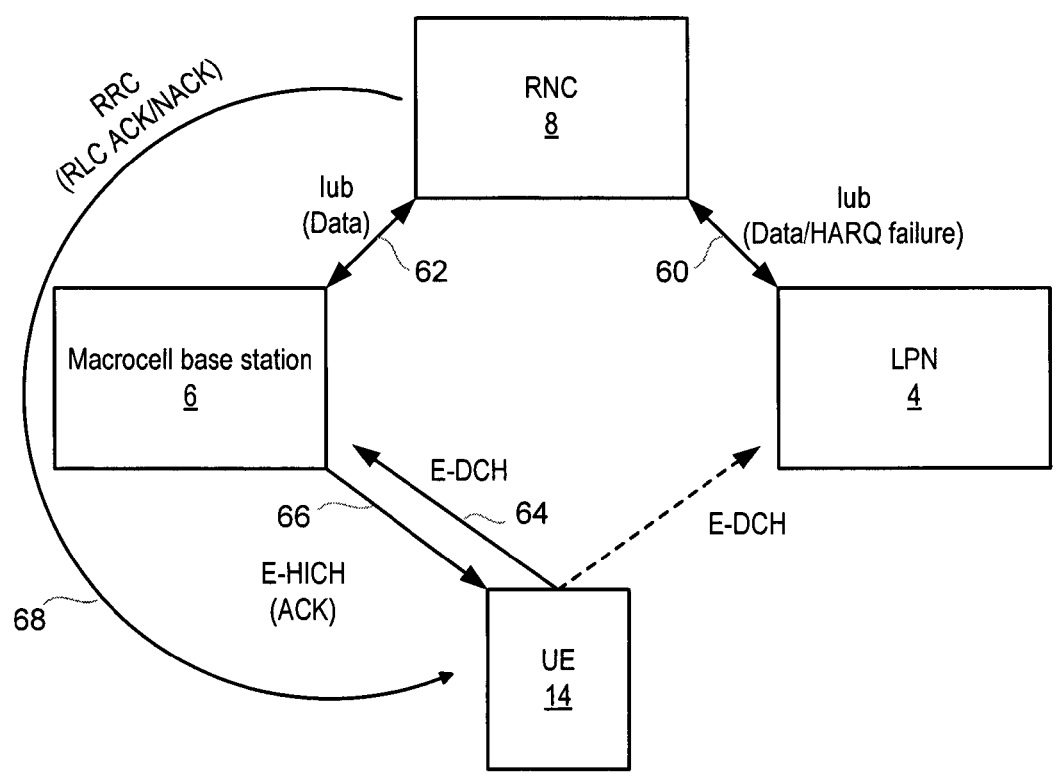
FIG. 10 is a diagram illustrating connections in a network according to a first embodiment.

FIG. 10 is a diagram showing connections in a network 2 according to the first embodiment. As in the network 2 shown in FIG. 1, a low-power base station (picocell base station/LPN 4) and higher-power base station (macrocell base station 6) are connected to a network node (radio network controller, RNC, 8). The picocell and macrocell base stations 4, 6 are connected to the RNC 8 via a respective Iub interface 60, 62. A mobile device 14 (UE 14) is connected to the macrocell base station 6 in the sense that the macrocell base station 6 is the serving cell handling all operations related to the uplink data channel (E-DCH) 64 as well as the downlink data channel (HS-DSCH—not shown in FIG. 10).

To enable the picocell base station 4 to 'eavesdrop' on the E-DCH transmission 64 from the UE 14, the picocell base station 4 will be configured appropriately by the network (for example by the RNC 8). By 'eavesdrop', it is meant that the picocell base station 4 has enough information to be able to decode the E-DCH transmission 64 from the UE 14. As a minimum, this information includes the scrambling code and/or radio network temporary identifier, RNTI, used by the UE 14 as well as the frame timing (so that the picocell base station 4 can maintain synchronicity with the UE 14). Furthermore, the RNC 8 is configured to expect to receive data and control information associated with the UE 14 from the eavesdropping picocell base station 4 (in addition to the usual data and control information from the serving cell base station), even though the picocell base station 4 is not the serving cell for the UE 14, and has no established downlink control connections (e.g. downlink physical layer control connections) with the UE 14.

FIG. 10 further shows that one or more downlink control channels 66 are established between the macrocell base station 6 and the UE 14. In the context of error handling for uplink data transmissions on E-DCH 64, the relevant control channel is the Enhanced-Hybrid ARQ Indicator Channel (E-HICH) 66. This control channel 66 carries the ACK/NACKs in response to the success or failure in decoding the uplink E-DCH data transmissions 64 at the macrocell base station 6.

In contrast to the macrocell base station 6 to UE 14 link, no DL control channels are configured or active on the picocell base station 4 to UE 14 link. This is the case when the UE 14 is in the CELL_FACH state, in which case true soft handover (e.g. as shown in FIG. 3) is not allowed, meaning no channels are explicitly configured other than to the serving cell (the macrocell base station 6). This means that even though the picocell base station 4 can attempt to decode the E-DCH 64 transmitted by the UE 14, it is not able to directly inform the UE 14 of the success or failure of the decoding. Thus, in order for the UE 14 to benefit from the presence of the picocell base station 4 and its ability to decode E-DCH 64 transmissions, some form of feedback is required.

Figure 11:
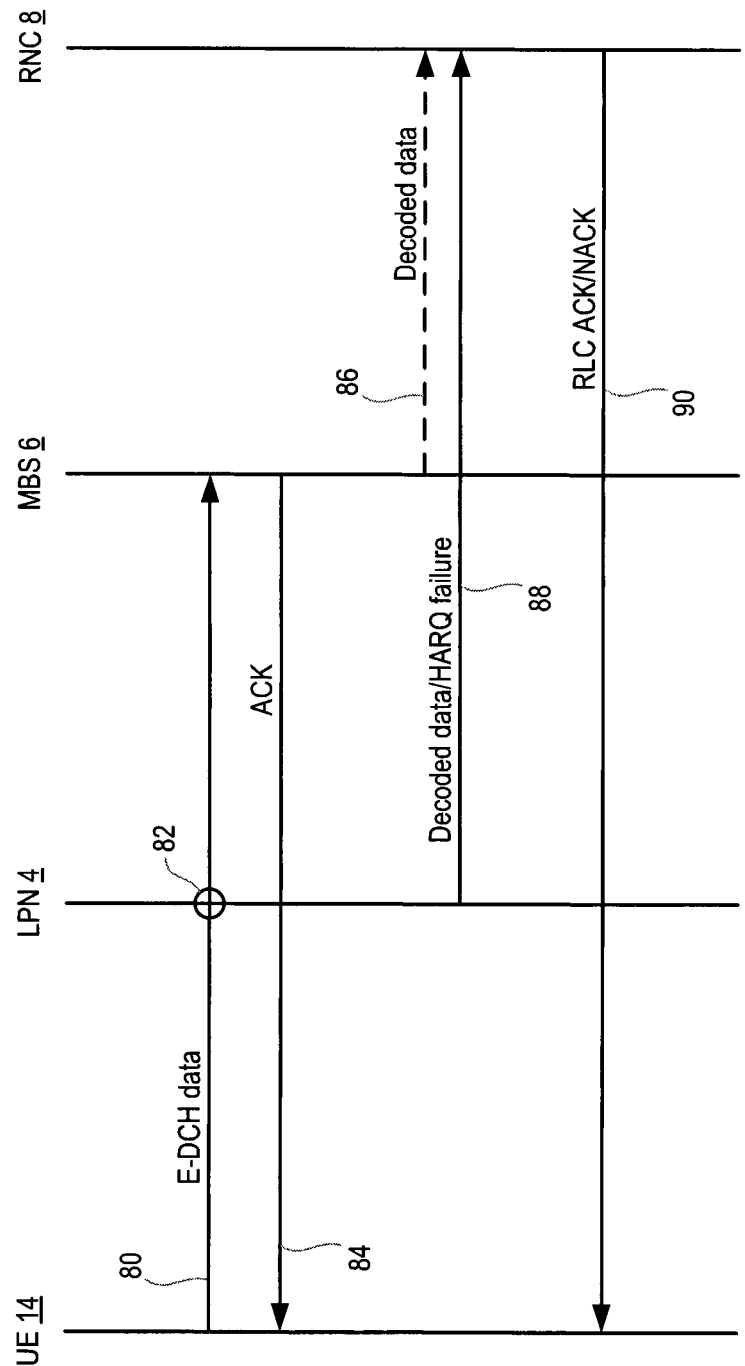
FIG. 11 is a signalling diagram illustrating a method according to the first embodiment.

FIG. 11 is a signalling diagram illustrating exemplary signalling between the UE 14, picocell base station 4, macrocell base station 6 and the RNC 8 according to the first embodiment. As indicated above, in the first embodiment HARQ is disabled on the macrocell base station 6 to UE 14 link by forcing the macrocell base station 6 to transmit an ACK message on the E-HICH 66 regardless of the success or failure of the decoding attempt at the macrocell base station 6. Thus, in FIG. 11, the UE 14 transmits data in E-DCH 80 to the macrocell base station 6 and the picocell base station 4 eavesdrops on the transmission (represented by circle 82). On receipt of the data transmission, and regardless of the outcome of the decoding of the data transmission by the macrocell base station 6, the macrocell base station 6 sends an ACK message 84 to the UE 14 in the downlink control channel E-HICH 66.

The result of this ACK transmission is that the UE 14 always considers its E-DCH transmissions 80 to have been successfully received and it is free to transmit new data every time it is scheduled to do so.

Both the picocell base station 4 and the macrocell base station 6 attempt to decode the received E-DCH data transmission 80. In the case of an HSPA network, decoding means decoding the MAC-i/is PDUs contained in the E-DCH transmission 80.

As indicated above, the picocell base station 4 to UE 14 link relies on the RLC selective repeat ARQ mechanism for error handling for the transmissions from the UE 14 since no physical layer (i.e. E-HICH) channel is available on that link. However, since the uplink channel between the UE 14 and the picocell base station 4 is typically better than that to the macrocell base station 6 when the UE 14 is in the imbalanced region 16, the E-DCH transmissions 80 are expected to be correctly decoded more frequently at the picocell base station 4, thus requiring infrequent reliance on RLC retransmissions.

Figure 6:
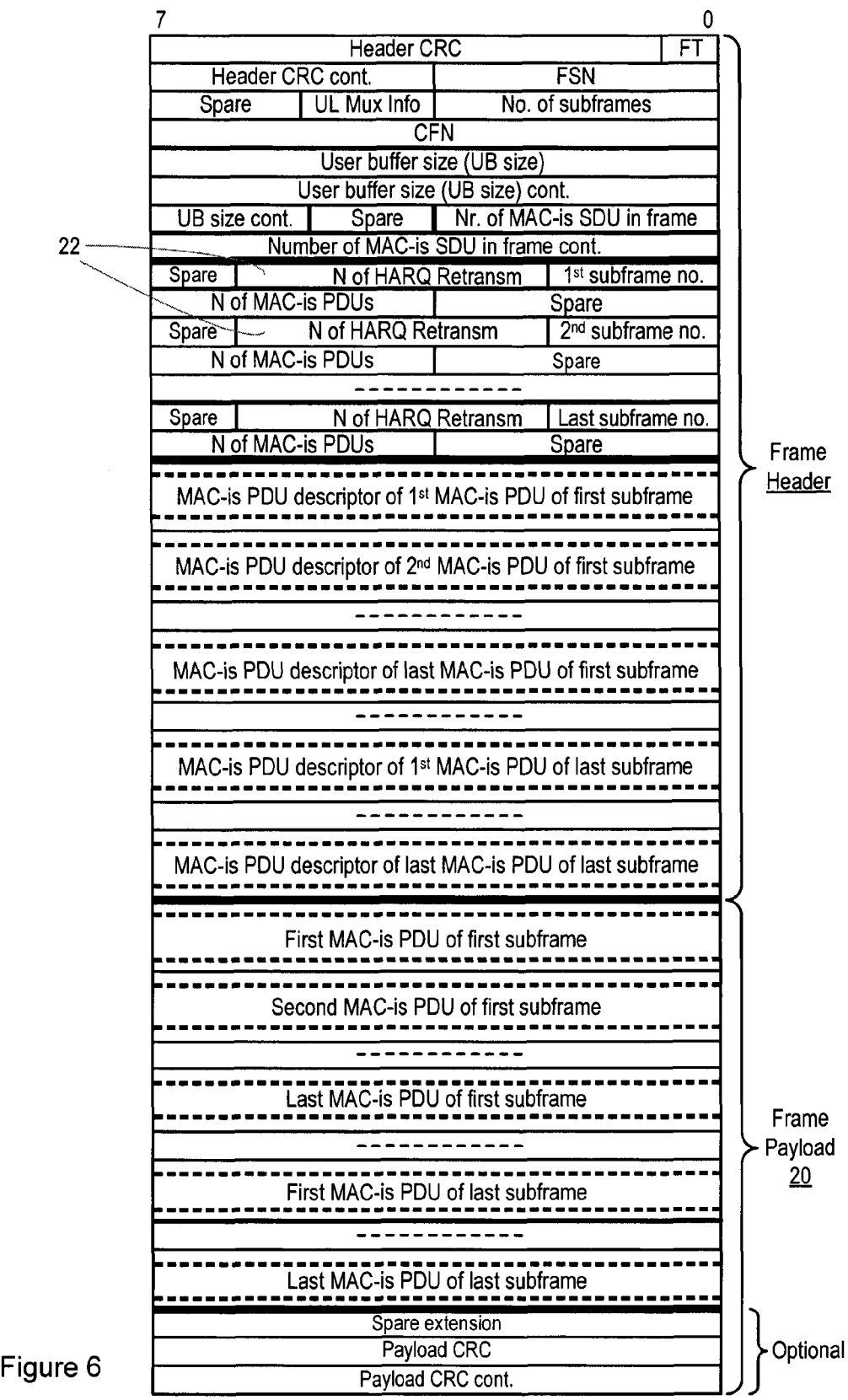
FIG. 6 is a diagram illustrating an exemplary structure of an uplink data frame in an HSPA network.

The signalling in the various scenarios of successful/unsuccessful decoding in the picocell base station 4 and macrocell base station 6 are set out below with reference to various fields in the E-DCH UL data frame shown in FIG. 6. Decoding success/failure refers to the result of the decoding the E-DCH transmission 80 at the base station 4, 6 after the first transmission of the relevant MAC-i/is-PDUs.

Macrocell Base Station 6
    Decoding successful:
        The correctly decoded MAC-i/is PDUs are sent over Iub 62 to the RNC 8 (signal 86 in FIG. 11). The number of transmissions field in the E-DCH data frame in FIG. 6 ("N of HARQ Retransm" field) is set to 1.
        The ACK is sent to the UE 14 on E-HICH 66 as described above (represented by signal 84).
    Decoding unsuccessful (failure):
        No transmission on Iub 62 to the RNC 8 (not even a signal indicating HARQ failure).
        The ACK is sent to the UE 14 on E-HICH 66 as described above (represented by signal 84).

Picocell Base Station 4
    Decoding successful:
        The correctly decoded MAC-i/is PDUs are sent to the RNC 8 over the Iub interface 60 between the picocell base station 4 and the RNC 8 (represented by signal 88 in FIG. 11). The number of transmissions field in the E-DCH data frame in FIG. 6 ("N of HARQ Retransm" field) is set to 1.
    Decoding failure:
        A HARQ failure is indicated to the RNC 8 via a transmission over the Iub interface 60 (also represented by signal 88 in FIG. 11). The number of transmissions field in the E-DCH data frame in FIG. 6 ("N of HARQ Retransm" field) is set to 1, and the number of MAC-i/is PDUs field ("N of MAC-is PDUs") is set to zero.

RNC 8
    At least one of the picocell base station 4 or macrocell base station 6 successfully decode the transmission:
        The E-DCH data frame received from the macrocell base station 6 over Iub 62 and/or picocell base station 4 over Iub 60 will contain decoded data (i.e. a payload of MAC-i/is PDUs), and an RLC ACK is sent to the UE 14 through higher layer (i.e. RRC) signalling. This higher layer signalling is shown in FIG. 11 as signal 90 from RNC 8 to UE 14. Of course it will be appreciated that from a physical layer perspective the RLC ACK signal will be sent to the UE 14 from the RNC 8 via the Iub interface 62 and the macrocell base station 6. The higher layer signalling is also shown in FIG. 10 by signal 68.
    Decoding failure at the picocell base station 4:
        The E-DCH data frame received from the picocell base station 4 will indicate a HARQ failure (signal 88), and an RLC NACK is sent to the UE 14 through higher layer (i.e. RRC) signalling. This higher layer signalling is also represented by signal 90 in FIG. 11.

As indicated above, the UE 14 will receive an ACK from the macrocell base station 6 in response to each E-DCH data transmission 80, which means that the UE 14 will consider the data to have been successfully decoded. However, subsequent receipt of an RLC NACK via the higher layer signalling 92 from the RNC 8 in respect of a particular data transmission will cause the UE 14 to resend the relevant data (i.e. MAC-i/is PDU).

Thus, even through the picocell base station 4 does not have an established signalling connection with the UE 14, the first embodiment provides a mechanism by which indications of the success and failure of data decoding at the picocell base station 4 can be used to trigger data retransmissions by the UE 14.

It will be noted that the operation of the RNC 8 indicated above assumes that failure by the picocell base station 4 to decode the data will coincide with a failure to decode the data by the macrocell base station 6 (since the RLC NACK is sent to the UE 14 if the picocell base station 4 fails to decode the E-DCH transmission 80, regardless of the success or failure of the decoding by the macrocell base station 6). Although this may often be the case (since the path loss to the picocell base station 4 is likely to be less than the path loss to the macrocell base station 6 when the UE 14 is in the imbalanced region 16), in an alternative implementation, the macrocell base station 6 can be configured to indicate a HARQ failure to the RNC 8 over Iub 62 in the case of a decoding failure, and the RNC 8 can assess the signals from both the picocell base station 4 and macrocell base station 6 in determining whether to send an RLC ACK or NACK to the UE 14 through the higher layer signalling.

Figure 12:
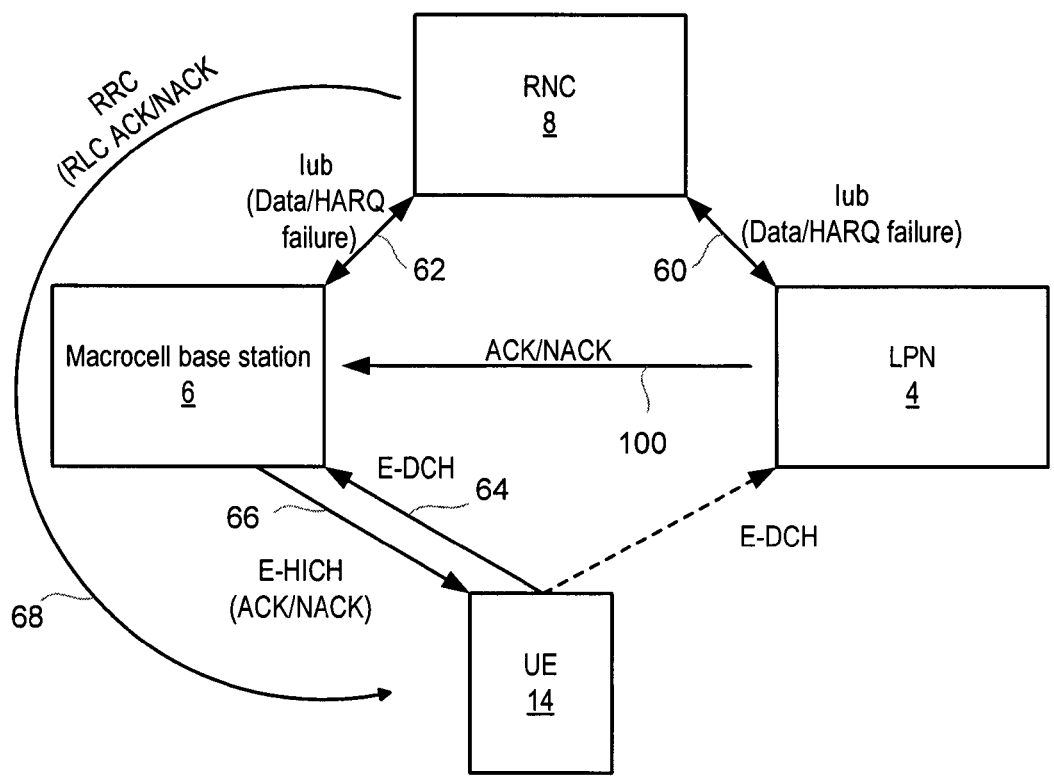
FIG. 12 is a diagram illustrating connections in a network according to a second embodiment.

FIG. 12 is a diagram showing connections in a network 2 according to the second embodiment. The network 2 in FIG. 12 corresponds largely to the network 2 shown in FIG. 10, and like reference numerals refer to the same elements in FIG. 10.

As with the first embodiment, the picocell base station 4 will be configured appropriately by the network (for example by the RNC 8) to eavesdrop on the data transmission by the UE 14, for example by providing the UE 14 with information on the scrambling code and/or radio network temporary identifier, RNTI, used by the UE 14, as well as the frame timing. Also as with the first embodiment, the RNC 8 will be configured to expect to receive data and control information associated with the UE 14 from the eavesdropping picocell base station 4 (in addition to the usual data and control information from the serving cell base station), even though the picocell base station 4 is not the serving cell for the UE 14, and has no established connections with the UE 14.

As indicated above, according to the second embodiment, feedback on the decoding by the picocell base station 4 is provided by communicating the HARQ ACK/NACK signal from the picocell base station 4 to the macrocell base station 6. This is shown in FIG. 12 by connection 100. Connection 100 is preferably a low latency backhaul connection.

It will be appreciated that although FIG. 12 suggests that picocell base station 4 and macrocell base station 6 might be in separate geographically distinct locations, they may in fact be co-located. An example is a main-remote type architecture in which the baseband processing is located at a central point and remote radio units including antennas are geographically separated in order to serve the UEs 14 in the macro and pico cells. In this type of architecture, the pico-macro connection 100 then consists simply of low latency information exchange between the baseband processing flows handling the macro and pico UEs 14 which are already co-located in the same main unit. For the case of non-co-located base stations 4, 6, the low latency connection 100 could, for example, be formed via signalling through the RNC 8 via Iub interfaces 60 and 62, provided that the latency is strictly controlled.

Using the low latency connection, the picocell base station 4 indicates the outcome of the E-DCH decoding to the macrocell base station 6 in the form of an ACK or NACK. The ACK/NACKs from the picocell base station 4 are then combined with the ACK/NACKs from the outcome of the E-DCH decoding at the macrocell base station 6 through, for example, a logical OR operation. If either the macrocell base station 6 or picocell base station 4 successfully decodes the E-DCH transmission, an ACK is sent to the UE 14 over the downlink E-HICH channel 66 already established between the macrocell base station 6 and the UE 14 since the macrocell base station 6 is the serving cell. For the case of a main-remote type architecture described above, effectively, this procedure shifts the macro diversity combining (selection combining) of the SHO legs away from the RNC 8 (as it is conventionally) to the macrocell base station 6.

Figure 13:
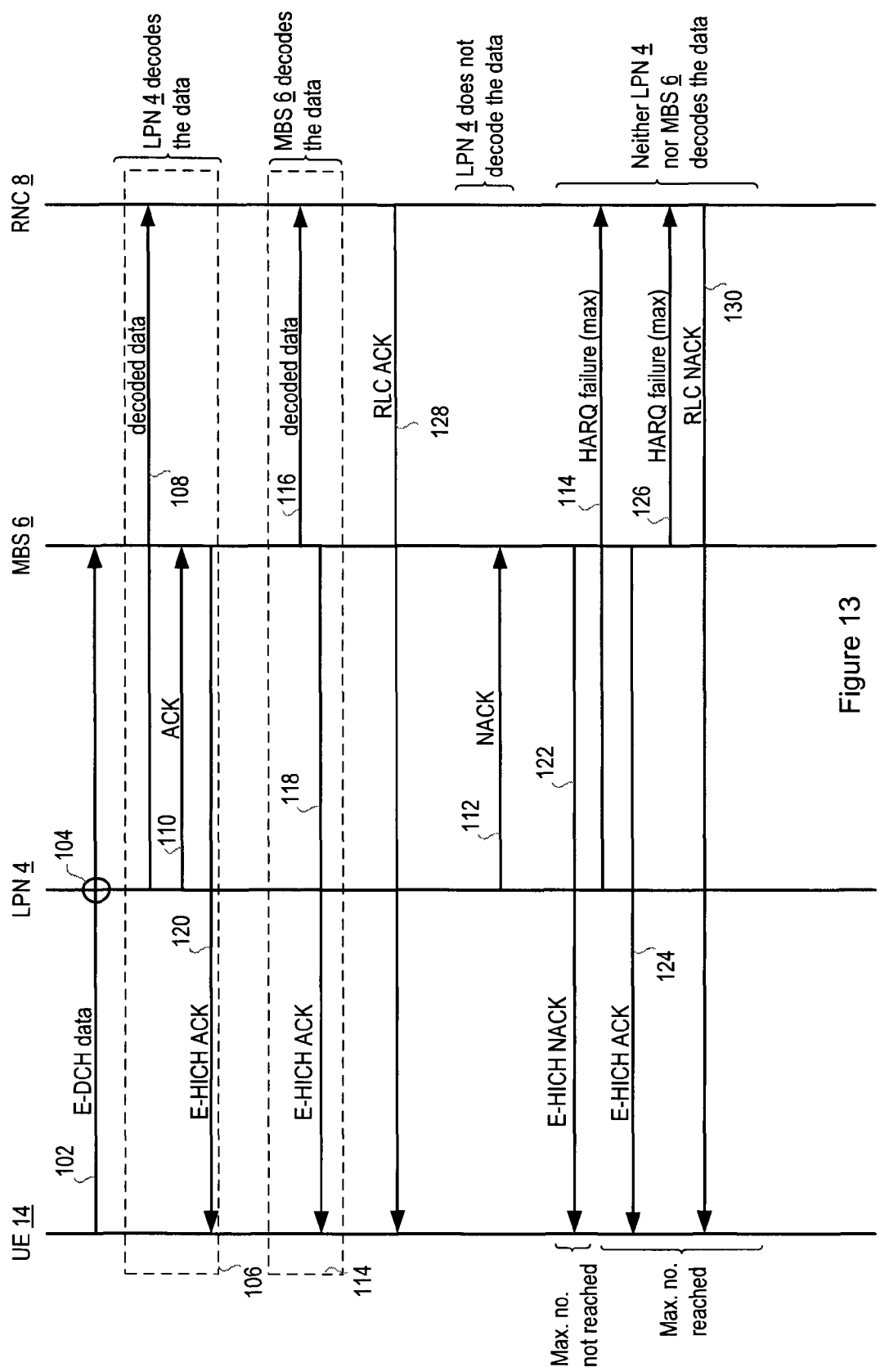
FIG. 13 is a signalling diagram illustrating a method according to the second embodiment.

FIG. 13 illustrates exemplary signalling between the UE 14, picocell base station 4, macrocell base station 6 and the RNC 8 according to the second embodiment. The UE 14 transmits data in E-DCH 102 to the macrocell base station 6 and the picocell base station 4 eavesdrops on the transmission (represented by circle 104). Both the picocell base station 4 and the macrocell base station 6 attempt to decode the received E-DCH data transmission 102. In the case of an HSPA network, decoding means decoding the MAC-i/is PDUs contained in the E-DCH transmission 102.

The signalling in the various scenarios of successful/unsuccessful decoding in the picocell base station 4 and macrocell base station 6 are set out below with reference to various fields in the E-DCH UL data frame shown in FIG. 6. Decoding success/failure refers to the result of the decoding the E-DCH transmission 102 at the base station 4, 6 after any given transmission of the relevant MAC-i/is-PDU.

Picocell Base Station 4

Decoding successful (indicated by dashed box 106 in FIG. 13):
  The correctly decoded MAC-i/is PDUs are sent to the RNC 8 over the Iub interface 60 between the picocell base station 4 and the RNC 8 (represented by signal 108 in FIG. 13). The number of transmissions field in the E-DCH data frame in FIG. 6 ("N of HARQ Retransm" field) is set to the actual number of transmissions required for successful decoding.
  An ACK (signal 110) is sent over low latency backhaul connection 100 to the macrocell base station 6.

Decoding failure:
  A NACK (signal 112) is sent over low latency backhaul connection 100 to the macrocell base station 6.
  If the maximum number of HARQ retransmissions has been reached, a HARQ failure signal is sent to the RNC 8 via the Iub interface 60 (signal 114 in FIG. 13). The number of transmissions field in the E-DCH data frame is set to the maximum number and the number of MAC-i/is PDUs field is set to zero.

Macrocell Base Station 6

Decoding successful (indicated by dashed box 114):
  The correctly decoded MAC-i/is PDUs are sent to the RNC 8 over the Iub interface 62 (signal 116). The number of transmissions field in the E-DCH data frame is set to the actual number of transmissions required for successful decoding.
  An ACK (signal 118) is sent to the UE 14 on E-HICH 66.
  Any ACK/NACK signal received from the picocell base station 4 over the connection 100 can be ignored, or alternatively combined with ACK signal 118 through a logical OR operation (although the result of this will still be an ACK).

Decoding failure:
  Combine the NACK generated by the macrocell base station 6 (but not yet sent to the UE 14) with the ACK/NACK signal (signal 110, 112 respectively) received from the picocell base station 4 through the connection 100 using a logical OR operation.
  If the combined result is ACK (i.e. the signal received from the picocell base station 4 is an ACK 110), an ACK is sent from the macrocell base station 6 to the UE 14 on E-HICH 66 (this is shown by signal 120 in FIG. 13, but it will be appreciated that this signal is effectively the same as ACK signal 118). The macrocell base station 6 does not send any data or signal to the RNC 8 via the Iub interface 62, as the picocell base station 4 will already have transmitted the data over its Iub interface 60.

If the combined result is NACK (i.e. both the macrocell base station 6 and the picocell base station 4 have failed to decode the data transmission 102) it is determined whether the maximum number of transmissions for the data have occurred.

If the maximum number has not yet been reached, a NACK (signal 122) is sent from the macrocell base station 6 to the UE 14 through E-HICH 66 (this triggers the UE 14 to resend the data transmission).

If the maximum number has been reached:
an ACK (signal 124) is sent to the UE 14 on E-HICH 66 (this will cause the UE 14 to move on with new data, but the decoding error will still be recognised and handled through the RLC layer as set out below).
Send HARQ failure signal (signal 126) to the RNC 8 via the Iub interface 62. Set the number of transmissions field in the E-DCH data frame to the maximum number and the number of MAC-i/is PDUs field to zero.

RNC 8

At least one of the picocell base station 4 or macrocell base station 6 successfully decode the transmission:
The E-DCH data frame received from the macrocell base station 6 over Iub 62 and/or picocell base station 4 over Iub 60 will contain decoded data (i.e. a payload of MAC-i/is PDUs), and an RLC ACK is sent to the UE 14 through higher layer (i.e. RRC) signalling. This higher layer signalling is shown in FIG. 13 as signal 128 from RNC 8 to UE 14. As above, it will be appreciated that from a physical layer perspective the RLC ACK signal will be sent to the UE 14 from the RNC 8 via the Iub interface 62 and the macrocell base station 6. The higher layer signalling is also shown in FIG. 11 by signal 68.

Decoding failure at both the picocell base station 4 and the macrocell base station 6:
The E-DCH data frame received from the picocell base station 4 and the macrocell base station 6 will indicate a HARQ failure (signals 114 and 126 respectively), and an RLC NACK is sent to the UE 14 through higher layer (i.e. RRC) signalling. This higher layer signalling is represented by signal 130 from the RNC 8 to the UE 14 in FIG. 13.

Thus, as with the first embodiment, even through the picocell base station 4 does not have an established signalling connection with the UE 14, a mechanism is provided by which indications of the success and failure of data decoding at the picocell base station 4 can be used to trigger data retransmissions by the UE 14.

In an alternative implementation to that described above, the picocell base station 4 can forward any correctly/successfully decoded MAC-i/is PDUs to the macrocell base station 6 over the low latency backhaul connection 100 (assuming that a connection 100 is available with high enough bandwidth), rather than signalling the decoded data to the RNC 8 via Iub interface 60. The macrocell base station 6 then forwards the data to the RNC 8 via its Iub interface 62. Furthermore, the picocell base station 4 could be configured to send HARQ failures to the macrocell base station 6 rather than the RNC 8. The advantage of this implementation is that the RNC 8 can be generally conventional, since it does not have to be configured to expect data or HARQ failure messages from picocell base station 4 (while it has no active connections with the UE 14).

In another alternative implementation, the picocell base station 4 can send I-Q samples of the signals received through antenna 44 to the macrocell base station 6 over the low latency (and high bandwidth) link for joint processing with the signals received using antenna 44 of the macrocell base station 6. One example of joint processing is 'soft combining' which is employed in softer handover. Another is joint antenna processing, as in uplink coordinated multipoint transmission/reception (CoMP) schemes such as interference rejection combining (IRC) or some form of multi-user detection (MUD)/interference cancellation (IC). In either case, decoding occurs after the joint processing and results in a single ACK/NACK being generated. This ACK/NACK is then forwarded to the UE over the E-HICH channel 66. In this case, only the macrocell base station 6 forwards decoded MAC-i/is PDUs or HARQ failure indications to the RNC 8 over the Iub interface 62.

In the embodiments described above, it is assumed that the data session of the UE 14 is operating in RLC acknowledge mode, meaning that the ARQ mechanism is operating at the RLC layer to recover for HARQ failures at the physical layer. However, HSPA also provides for an unacknowledged mode for delay sensitive data, such as voice over IP (VoIP), that cannot afford the latency incurred by RLC retransmissions. Both of the above embodiments can be applied to a UE 14 operating in an unacknowledged mode, in which case the RNC 8 does not transmit RLC ACK/NACKs via RRC signalling, and the UE 14 does not expect to receive them.

It will be appreciated that in both of the above embodiments, it is totally transparent to the UE 14 that a second base station (the picocell base station 4) is participating in the decoding process. In both embodiments, the UE 14 receives an error indication either through higher layer signalling that originates from the RNC 8 (both embodiments) or through physical layer signalling transmitted from the macrocell base station 6 (second embodiment). From the perspective of the UE 14, only the macrocell base station 6 is involved in decoding, and the UE 14 responds to error control signalling in the same way it would if the picocell base station 4 was not involved.

Figure 14:
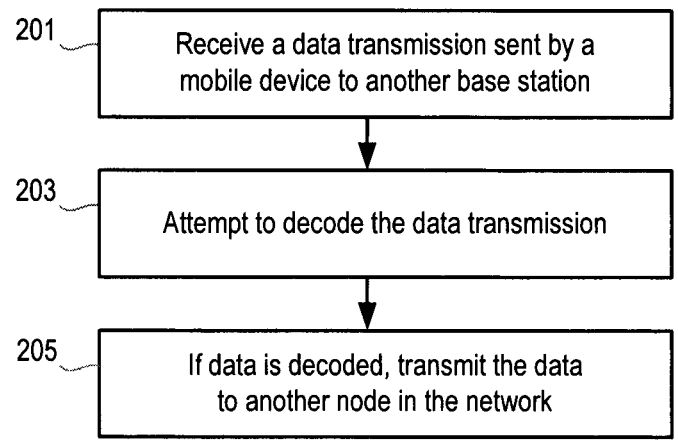
FIG. 14 is a flow chart illustrating a method of operating a low-power base station according to the first and second embodiments.

The flow chart shown in FIG. 14 sets out a method of operating a low-power base station 4 according to the above embodiments. In step 201, the low-power base station 4, which is located generally within the coverage area of a higher-power base station 6, and which does not have active data or control channel connections with a mobile device 14 that is being served by the higher-power base station 6, receives a data transmission that is sent by the mobile device 14 to the higher-power base station 6 in a data uplink channel (for example E-DCH).

The low-power base station 4 processes the received data transmission and attempts to decode the received signals, and in particular decode the data packets contained in the signals (step 203). To allow the low-power base station 4 to do this, the low-power base station 4 is preferably provided with a scrambling code and/or an identifier used by the mobile device 14, as well as information on the timing of the transmissions from the mobile device 14 (e.g. frame timings).

If the low-power base station 4 is able to decode the received signals (for example if the low-power base station 4 is able to extract the data packets (MAC-i/is PDUs) from the received signals, then the low power base station 4 transmits the decoded data to another node in the network 2 (step 205). As described above, the low-power base station 4 may transmit the decoded data to a network node 8 that controls the low-power base station 4 and higher-power base station 6, for example to radio network controller (RNC) 8 via Iub interface 60, or the low-power base station 4 can transmit the decoded data to the higher-power base station 6. In the latter case, the low-power base station 4 can alternatively transmit the I-Q samples of the received data transmission to the higher-power base station 6.

In the second embodiment, in addition to the low-power base station 4 transmitting the decoded data to the RNC 8, the low-power base station 4 can also transmit a positive decoding signal (e.g. an ACK signal) to the higher-power base station 6.

If the low-power base station 4 is unable to decode the received signals, then the low-power base station 4 transmits a signal indicating its failure to decode the received signals to the network node (RNC 8) or to the higher-power base station 6, depending on the embodiment implemented. As described above, in the first embodiment, the low-power base station 4 transmits a failure message (e.g. HARQ failure) to the RNC 8. Alternatively, in the second embodiment, the low-power base station 4 transmits a failure message in the form of a NACK message to the higher-power base station 6 (when a maximum number of retransmissions has not been exceeded), or (when a maximum number of retransmissions has been met or exceeded) a failure message, e.g. HARQ failure, to the higher-power base station 6 or RNC 8.

Figure 15:
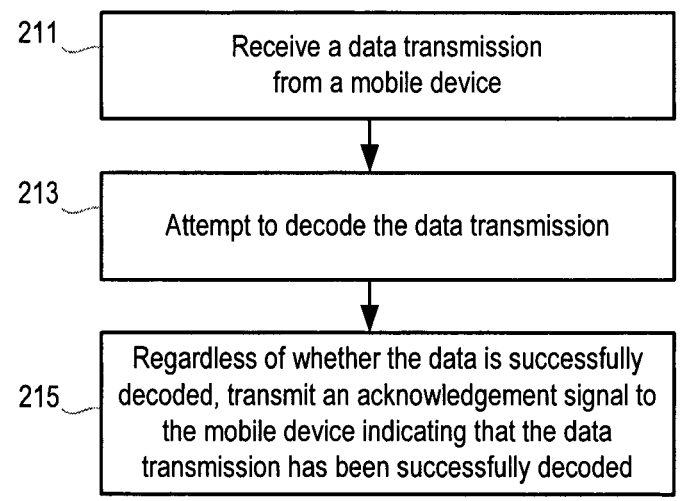
FIG. 15 is a flow chart illustrating a method of operating a higher-power base station according to the first embodiment.

The flow chart in FIG. 15 shows a method of operating a higher-power base station 6 according to the first embodiment described above. In step 211, the higher-power base station 6, which is the serving base station for a mobile device 14, receives a data transmission from the mobile device 14 in a data uplink channel (for example E-DCH). The higher-power base station 6 then attempts to decode the data transmission (step 213), for example to extract the data packets encoded therein.

Then, regardless of whether the data has been or is successfully decoded, the higher-power base station 6 transmits an acknowledgement signal to the mobile device 14 indicating that the data has been successfully decoded (step 215). The acknowledgement signal can be an ACK signal. The transmission of this positive acknowledgement in these circumstances effectively disables the physical layer hybrid-ARQ procedure that is executing in the higher-power base station 6, and allows data retransmissions to be managed by the RNC 8 in response to decoding attempts by the low-power base station 4.

If the higher-power base station 6 does successfully decode the data transmission, the decoded data is transmitted to a network node that is controlling the higher-power base station 6, for example RNC 8.

If the higher-power base station 6 is unsuccessful in decoding the data transmission, then the higher-power base station 6 does not send any signal to the RNC 8.

In alternative implementations, if the higher-power base station 6 is unsuccessful in decoding the data transmission, then the higher-power base station 6 can send a HARQ failure to the RNC 8 over the Iub interface 62.

Figure 16:
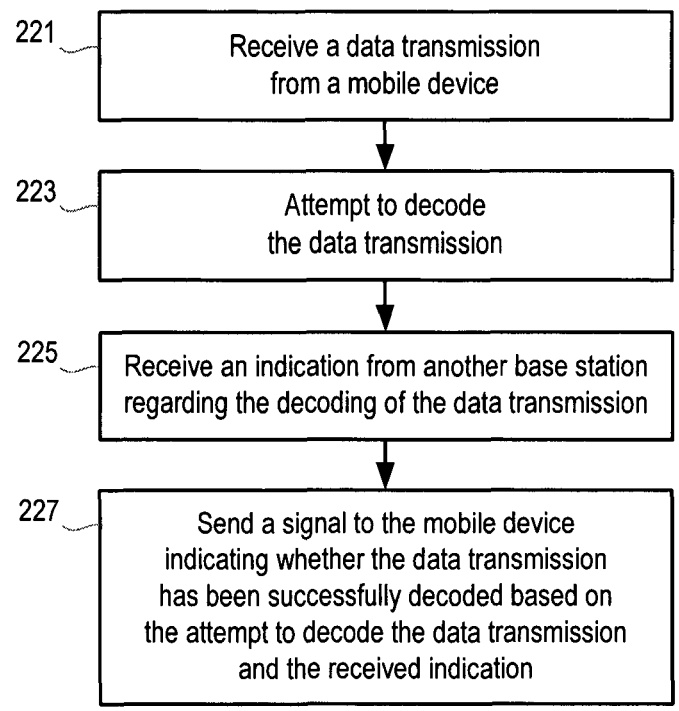
FIG. 16 is a flow chart illustrating a method of operating a higher-power base station according to the second embodiment.

The flow chart in FIG. 16 shows a method of operating a higher-power base station 6 according to the second embodiment described above. In step 221, the higher-power base station 6, which is the serving base station for a mobile device 14, receives a data transmission from the mobile device 14 in a data uplink channel (for example E-DCH). The higher-power base station 6 then attempts to decode the data transmission (step 223), for example to extract the data packets encoded therein.

Then, the higher-power base station 6 receives an indication from another base station (the low-power base station 4) regarding the decoding of the data transmission (step 225). The indication can comprise a positive acknowledgement (ACK) signal indicating that the other base station 4 has successfully decoded the data, the data decoded by the other base station 4, or a negative acknowledgement (NACK) signal indicating that the other base station 4 has not successfully decoded the data, as appropriate.

The higher-power base station 6 then determines in step 227 whether an ACK or NACK signal regarding the data transmission should be sent to the mobile device 14 based on the indication received from the other base station 4 in step 225 and the result of the attempt by the higher-power base station 6 to decode the data in step 223.

This indication can be determined based on the criteria set out above in the description of FIG. 13. Briefly, if one or both of the low-power base station 4 and higher-power base station 6 have successfully decoded the data, then a positive acknowledgement is sent by the higher-power base station 6 to the mobile device 14 through a downlink control channel (e.g. E-HICH 66). If neither of the base stations 4, 6 have successfully decoded the data transmission, a negative acknowledgement (NACK) is sent to the mobile device 14.

In addition, if a maximum number of retransmissions for the data has been met or exceeded, the higher-power base station 6 sends a failure message, e.g. a HARQ failure message, to the RNC 8 via the Iub interface 62.

Figure 17:
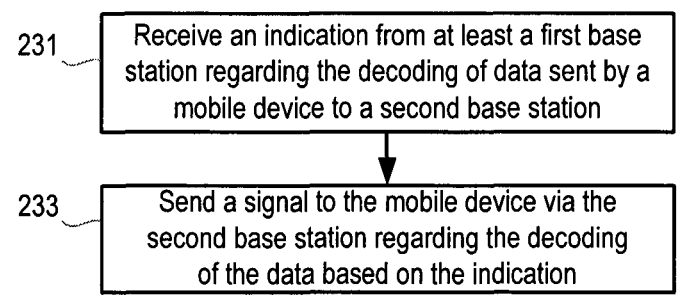
FIG. 17 is a flow chart illustrating a method of operating a network node, such as a radio network controller according to the first and second embodiments.

The flow chart in FIG. 17 sets out a method of operating a network node, such as a radio network controller, RNC 8, according to the above embodiments. The network node 8 is configured to control a first (low-power) base station 4 and a second (higher-power) base station 6. The low-power base station 4 is located generally within the coverage area of the higher-power base station 6, but it does not have active data or control channel connections with a mobile device 14 that is being served by the higher-power base station 6. To enable the low-power base station 4 to receive data transmissions sent by the mobile device 14 to the higher-power base station 6 in a data uplink channel (for example E-DCH), the network node 8 can transmit information to the low-power base station 4 including a scrambling code and/or an identifier used by the mobile device 14 in making the data transmission, as well as information on the timing of the transmissions from the mobile device 14 (e.g. frame timings).

Following a data transmission from the mobile device 14, the network node 8 receives an indication from at least the first (low-power) base station 4 regarding the decoding of the data transmission (step 231). This indication from the low-power base station 4 can comprise the decoded data (if the low-power base station 4 has successfully decoded the data transmission) or a HARQ failure indicating that the decoding has been unsuccessful. If an indication is received from the higher-power base station 6, the indication can also comprise the decoded data or a HARQ failure.

The network node 8 then sends a signal to the mobile device 14 via the higher-power (serving) base station 6 regarding the data transmission based on the indication (step 233). This signal can be a higher layer acknowledgement signal, for example an RLC ACK or RLC NACK. An ACK signal will be sent if the network node 8 has received decoded data from either of the base stations 4, 6, and a NACK signal will be sent if the network node 8 has received a HARQ failure from either or both base stations 4, 6 (depending on the embodiment the network node 8 is configured to operate in).

There is therefore provided an improved way of managing the operation of mobile communication devices in an imbalanced region of a heterogeneous network, for example by enabling separation between the uplink and downlink transmissions, particularly for devices operating in the CELL_FACH state (or similar states in other types of mobile communication networks).

It will be appreciated that the base stations 4, 6 and/or RNC 8 can be configured to implement the methods described above using suitable software or firmware, or by providing the base station 4, 6 and/or RNC 8 with a suitably configured processor, processing module, application-specific integrated circuit (ASIC), field-programmable gate array (FPGA), etc.

It will also be appreciated that a single base station can be configured to operate according to any combination of the methods described above with reference to FIGS. 14, 15 and 16 since a base station (for example a microcell base station) can operate as a low-power base station in one situation (e.g. when compared to a macrocell base station) and a higher-power base station in another situation (e.g. when compared to a femtocell or picocell base station). Thus, the mode of operation of the base station can be selected based on the context in which the base station is used.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method of operating a mobile communication network, the mobile communication network comprising a mobile device, a first base station, a second base station, and a node that controls the first and second base stations, the mobile device having an active connection with the second base station, the mobile device not having an active connection with the first base station, the method comprising:
   receiving, by the first base station, a data transmission sent from the mobile device to the second base station in absence of the active connection between the mobile device and the first base station to receive the data transmission;
   attempting, by the first base station, to decode the data transmission;
   in the event that the data transmission is successfully decoded, transmitting, by the first base station, the decoded data to the node or the second base station; and
   sending a signal to the mobile device from the node via the second base station indicating the successful decoding of the transmitted data.

2. The method as claimed in claim 1, wherein, in the event that the data transmission is successfully decoded, the step of transmitting comprises transmitting, by the first base station, the decoded data to the node, and the method further comprises the step of:
   transmitting, by the first base station, a signal to the node indicating a decoding failure in the event that the data transmission is not successfully decoded.

3. The method as claimed in claim 1, wherein the step of transmitting comprises transmitting, by the first base station, the decoded data to the node in the event that the data transmission is successfully decoded, and the method further comprises the step of:
   transmitting, by the first base station, a signal to the second base station indicating the success or failure of the attempt to decode the data transmission.

4. The method as claimed in claim 3, wherein the method further comprises the step of:
   transmitting, by the first base station, a signal to the node indicating a decoding failure in the event that the data transmission is not successfully decoded after a predetermined number of retransmissions of the data transmission by the mobile device.

5. The method as claimed in claim 1, wherein the decoded data comprises I-Q samples of the received data transmission and the step of transmitting comprises transmitting, by the first base station, the I-Q samples to the second base station.

6. The method as claimed in claim 1, the method further comprising the steps of:
   receiving, by the first base station, an indication of a scrambling code and/or an identifier used by the mobile device in transmitting data; and
   receiving, by the first base station, information on timing of data transmission by the mobile device;
   wherein the steps of receiving the data transmission and attempting to decode the data transmission comprises using the received indication of the scrambling code and/or the identifier and the information on the timing of data transmission by the mobile device.

7. A method of operating a mobile communication network, the mobile communication network comprising a mobile device, a first base station, a second base station, and a node that controls the first and second base stations, the mobile device having an active connection with the second base station, the mobile device not having an active connection with the first base station, the method comprising:
   receiving, by the second base station, a data transmission from the mobile device;
   attempting, by the second base station, to decode the data transmission; and
   transmitting a signal to the mobile device from the node via the second base station indicating that the data transmission has been successfully decoded.

8. The method as claimed in claim 7, the method further comprising the step of:
   transmitting, by the second base station, the decoded data to the node in the event that the data transmission is successfully decoded.

9. The method as claimed in claim 7, the method further comprising:
   receiving, by the second base station, a higher layer signal indicating successful or unsuccessful decoding of the data transmission from the node; and
   transmitting, by the second base station, the higher layer signal indicating the successful or unsuccessful decoding of the data transmission to the mobile device.

10. A method of operating a mobile communication network, the mobile communication network comprising a mobile device, a first base station, a second base station, and a node that controls the first and second base stations, the mobile device having an active connection with the second base station, the mobile device not having an active connection with the first base station, the method comprising:
receiving, by the second base station, a data transmission from the mobile device;
attempting, by the second base station, to decode the data transmission;
receiving, by the second base station, an indication from the first base station regarding the data transmission; and
sending a signal to the mobile device from the node via the second base station indicating whether the data transmission has been successfully decoded based on the attempt to decode the data transmission and the received indication.

11. The method as claimed in claim 10, wherein the indication received from the first base station is a signal indicating whether the first base station has decoded the data transmission from the mobile device.

12. The method as claimed in claim 11, wherein the signal indicating whether the first base station has decoded the data transmission comprises the decoded data following successful decoding of the data transmission by the first base station.

13. The method as claimed in claim 12, the method further comprising the step of transmitting, by the second base station, the decoded data received from the first base station to the node if the second base station does not otherwise successfully decode the data transmission.

14. The method as claimed in claim 11, wherein the step of sending a signal to the mobile device comprises:
sending a signal indicating that the data transmission has been successfully decoded in the event that either or both of (i) the second base station successfully decodes the data transmission, and (ii) the indication received from the first base station indicates that the first base station has successfully decoded the data transmission.

15. The method as claimed in claim 11, wherein the step of sending a signal to the mobile device comprises:
sending, by the second base station, a signal indicating that the data transmission has not been successfully decoded in the event that (i) the second base station does not successfully decode the data transmission, and (ii) the indication received from the first base station indicates that the first base station has not successfully decoded the data transmission.

16. The method as claimed in claim 10, wherein the indication received from the first base station regarding the data transmission comprises I-Q samples of the data transmission received at the first base station, and wherein the step of attempting, by the second base station, to decode the data transmission includes using the received I-Q samples to decode the data transmission.

17. The method as claimed in claim 16, wherein the step of sending a signal to the mobile device comprises:
sending, by the second base station, a signal indicating that the data transmission has been successfully decoded in the event that the second base station successfully decodes the data transmission using the received I-Q samples.

18. The method as claimed in claim 16, wherein the step of sending a signal to the mobile device comprises:
sending, by the second base station, a signal indicating that the data transmission has not been successfully decoded in the event that the second base station does not successfully decode the data transmission using the received I-Q samples.

19. The method as claimed in claim 10, wherein the method further comprises the step of:
transmitting the decoded data to the node in the event that the data transmission is successfully decoded by the second base station.

20. The method as claimed in claim 10, wherein the method further comprises the step of:
transmitting, by the second base station, a signal to the node indicating a decoding failure in the event that the data transmission is not successfully decoded after a predetermined number of retransmissions of the data transmission by the mobile device.

21. The method as claimed in claim 10, the method further comprising:
receiving, by the second base station, a higher layer signal indicating successful or unsuccessful decoding of the data transmission from the node; and
transmitting, by the second base station, the higher layer signal indicating the successful or unsuccessful decoding of the data transmission to the mobile device.

22. A method of operating a node in a mobile communication network, the mobile communication network comprising a mobile device, a first base station, a second base station, and the node that controls the first and second base stations, the mobile device having an active connection with the second base station, the mobile device not having an active connection with the first base station, the method comprising:
following transmission of data from the mobile device to the second base station, receiving, by the node, an indication regarding decoding of the transmitted data from the first base station and the second base station;
in the event that one or both of the first and second base stations successfully decode the transmitted data:
receiving, by the node, the decoded data from the one or both of the first and second base stations that successfully decoded the transmitted data; and
based on the received indication, sending a signal to the mobile device from the node via the second base station indicating that the transmitted data has been successfully decoded; and
in the event that neither of the first and second base stations successfully decode the transmitted data, sending a signal to the mobile device via the second base station indicating the unsuccessful decoding of the transmitted data based on the received indication.

23. The method as claimed in claim 22, wherein the indication received from the first base station comprises the decoded data in the event that the first base station successfully decodes the data transmission.

24. The method as claimed in claim 22, wherein the indication received from the first base station comprises either (i) a signal indicating that decoding of the data transmission has been unsuccessful at the first base station in the event that the first base station is unsuccessful in decoding the data transmission; or (ii) a signal indicating that decoding of the data transmission has been unsuccessful at the first base station in the event that the first base station is unsuccessful in decoding the data transmission following a predetermined number of retransmissions of the data transmission by the mobile device.

25. The method as claimed in claim 22, wherein the indication received from the second base station comprises the decoded data in the event that the second base station successfully decodes the data transmission.

26. The method as claimed in claim 22, wherein the indication received from the second base station comprises a signal indicating that decoding of the data transmission has been unsuccessful in the event that the second base station is unsuccessful in decoding the data transmission.

27. The method as claimed in claim 22, wherein the indication received from the second base station comprises a signal indicating that decoding of the data transmission has been unsuccessful at the second base station in the event that the second base station is unsuccessful in decoding the data transmission following a predetermined number of retransmissions of the data transmission by the mobile device.

28. The method as claimed in claim 22, wherein the step of sending a signal to the mobile device comprises sending either a radio link control (RLC) ACK signal to the mobile device based on the received indication in the event that the one or both of the first and second base stations successfully decode the transmitted data, or sending a RLC NACK signal to the mobile device based on the received indication in the event that neither of the first and second base stations successfully decode the transmitted data.

29. A method of operating a mobile communication network, the mobile communication network comprising a mobile device, a first base station, a second base station, and a node that controls the first and second base stations, the mobile device having an active connection with the second base station, the mobile device not having an active connection with the first base station, the method comprising:
 the mobile device transmitting data to the second base station;
 receiving the transmitted data at the first and second base stations;
 attempting to decode the transmitted data at each of the first and second base stations;
 in the event that one or both of the first and second base stations successfully decode the transmitted data:
  transmitting the decoded data from the one or both of the first and second base stations that successfully decoded the data to the node; and
  sending a signal to the mobile device from the node via the second base station indicating the successful decoding of the transmitted data; and
 in the event that neither of the first and second base stations successfully decode the transmitted data, sending a signal to the mobile device via the second base station indicating the unsuccessful decoding of the transmitted data.

* * * * *